Dec. 10, 1957 W. W. WOODWARD 2,815,745
GANG SAW CONSTRUCTION FOR CUTTING STONE
Filed Feb. 20, 1956 3 Sheets-Sheet 1

INVENTOR.
WALTER W. WOODWARD.
BY Lockwood, Galt, Woodard & Smith
ATTORNEYS.

Dec. 10, 1957 W. W. WOODWARD 2,815,745
GANG SAW CONSTRUCTION FOR CUTTING STONE
Filed Feb. 20, 1956 3 Sheets-Sheet 3

INVENTOR.
WALTER W. WOODWARD.
BY
Lockwood, Galt, Woodard & Smith
ATTORNEYS.

United States Patent Office 2,815,745
Patented Dec. 10, 1957

2,815,745

GANG SAW CONSTRUCTION FOR CUTTING STONE

Walter W. Woodward, Bedford, Ind.

Application February 20, 1956, Serial No. 566,549

8 Claims. (Cl. 125—16)

This invention relates to a gang saw machine for cutting stone, and more particularly to one wherein the saws are mounted so as to cut vertical kerfs as distinguished from horizontal ones, thereby realizing many advantages as hereinafter described in detail.

Heretofore, it has been conventional in this art to provide horizontally reciprocable saws which perform a sideways cutting action as they are automatically stepped or moved downwardly. Many disadvantages have characterized such saws. First, the length of the stone slabs cut from the quarried block is limited by the size of the machine and is directly proportional to the length of the machine. However, it is frequently desirable that longer slabs be cut for later use in the form of columns and the like. The conventional machines are incapable of cutting such lengths for the reasons stated.

Second, there is the disadvantage in the conventional machines of lost motion. That is to say, once the saws have cut through the block it is necessary to return them upwardly to a point above the slabs. This return stroke, of course, takes time.

Third, there is always the danger of damage to the saws in lifting them upwardly out of the kerfs because of the shifting from one vertical position to another of the slabs that have been cut. Such shifting may result in a narrowing if not a complete restricting of the kerfs thereby impeding or completely obstructing the upward movement of the saws until there has been a re-alignment of the slabs to provide a path for their ready exit.

Fourth, the cutting operation has had to be interrupted in connection with conventional machines in order to tie the slabs together. Fifth, the substantially horizontal reciprocation of the saws has tended to cause an accumulation of cuttings in spite of washing-out or flushing efforts, thus resulting in a binding action on the part of the saws. Sixth, it has been necessary to pull saw trucks out from under the saw, then to unload the slabs and reload it with blocks and pull it back into cutting position. Seventh, large foundations of concrete have been necessary as a result of which the expense of the operation has been appreciably increased. Eighth, the floor space and installation cost of such machines has been substantial as have the maintenance and repair problems that are always inherent in such relatively complex machines.

It is the primary object of the present invention to provide a self-contained gang saw machine which substantially reduces if not entirely eliminates the difficulties, problems and disadvantages enumerated above. The primary feature of the present invention resides in a construction and arrangement of gang saws such as to enable the stone to be fed to the saw for the cutting of vertical kerfs or grooves.

With the present invention, any length of stone may be cut for the reason as stated that the block is fed to the saws for cutting vertical kerfs therein. There is thus no length problem such as that encountered with the conventional machines wherein the length of the slab is in direct proportion to the size of the machines and the stroke, along a horizontal plane, of the gang saws. Furthermore, in connection with the present invention, once the block is cut from one end to the other, the saws are free and clear of the slabs. The problem of lifting the saws upwardly which characterizes conventional machines is thus completely eliminated.

A still further object of the invention is to provide a machine of the character described wherein the saws are so mounted as to cut a vertical groove of scalloped conformation. While the groove cut by some of the conventional machines may be slightly inclined, it is nonetheless necessary for water pressure or other washout means to be employed in their operation to remove the cuttings and avoid the binding action of the blades. In the present invention, on the other hand, a natural gravity fall-out of the cuttings is realized.

It is a still further object of the present invention to provide a machine which because of the simplicity of its construction and operation saves a substantial amount of set-up time and also reduces maintenance costs and expenses.

The full nature of the invention will be understood from the accompanying drawings and the following description and claims.

In the drawings Fig. 1 is a transverse section view of the invention along the lines 1—1 of Fig. 3 in the direction of the arrows.

Figure 1:
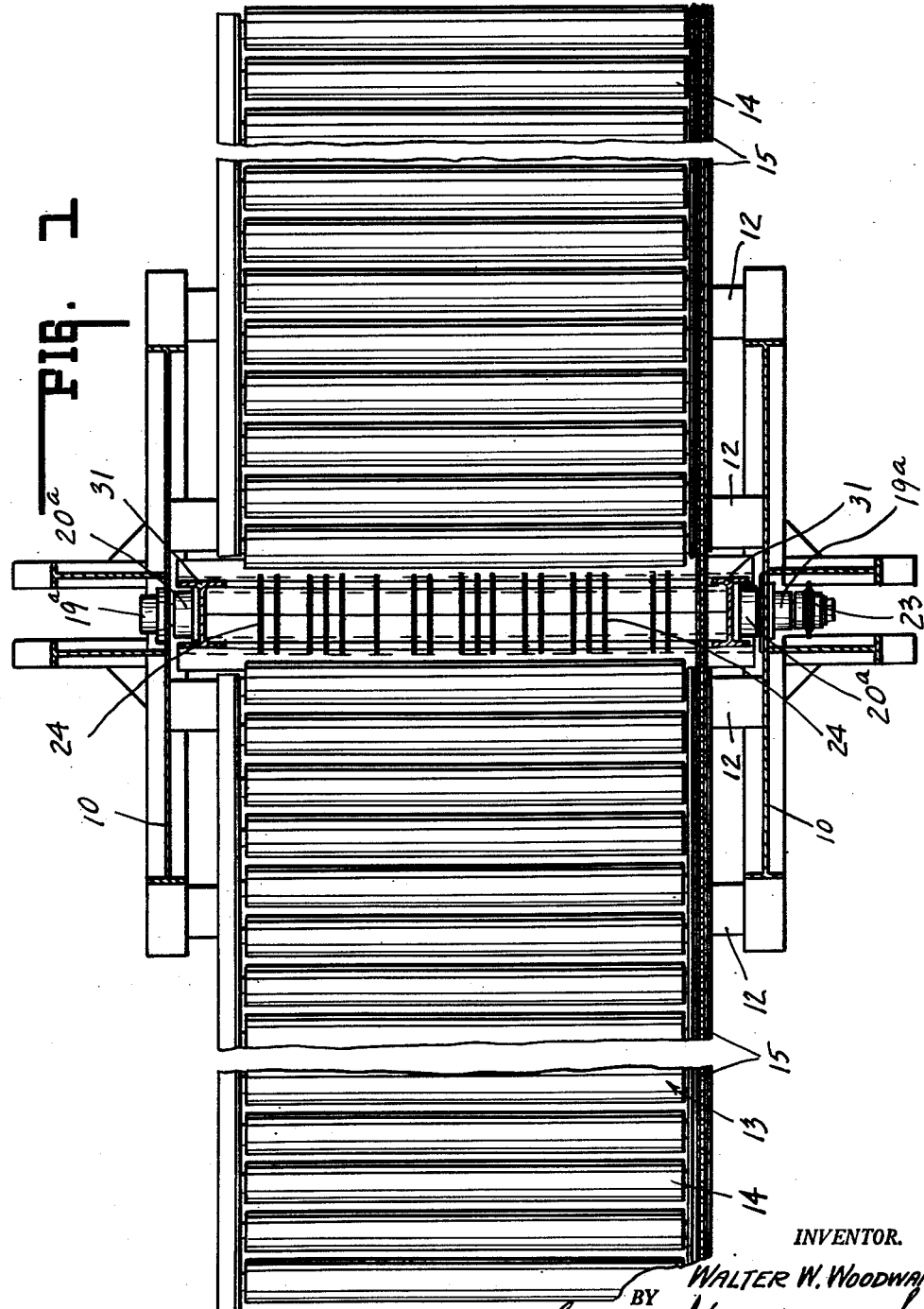

In the drawings are two opposed side frames 10 which are connected near the top by beam struts such as that illustrated at 11. There may be several others of these provided if believed necessary in order to bring about the desired rigidity to the entire construction. As will be observed by reference particularly to Fig. 2, the side frames are substantially triangular in conformation with the base portions thereof being connected by a plurality of supporting beams 12. These last mentioned beams also support the power conveyor mechanism shown generally at 13. The power conveyor mechanism comprises a plurality of rollers 14, interconnected by a conventional chain 15 and driven in the direction of the arrow shown in Fig. 2 by suitable means (not shown). No claim to the power means or to the conveyor mechanism per se is made, since conventional equipment may be adapted for the intended purpose which is to support a block of stone and feed it into the gang saws.

Figure 3:
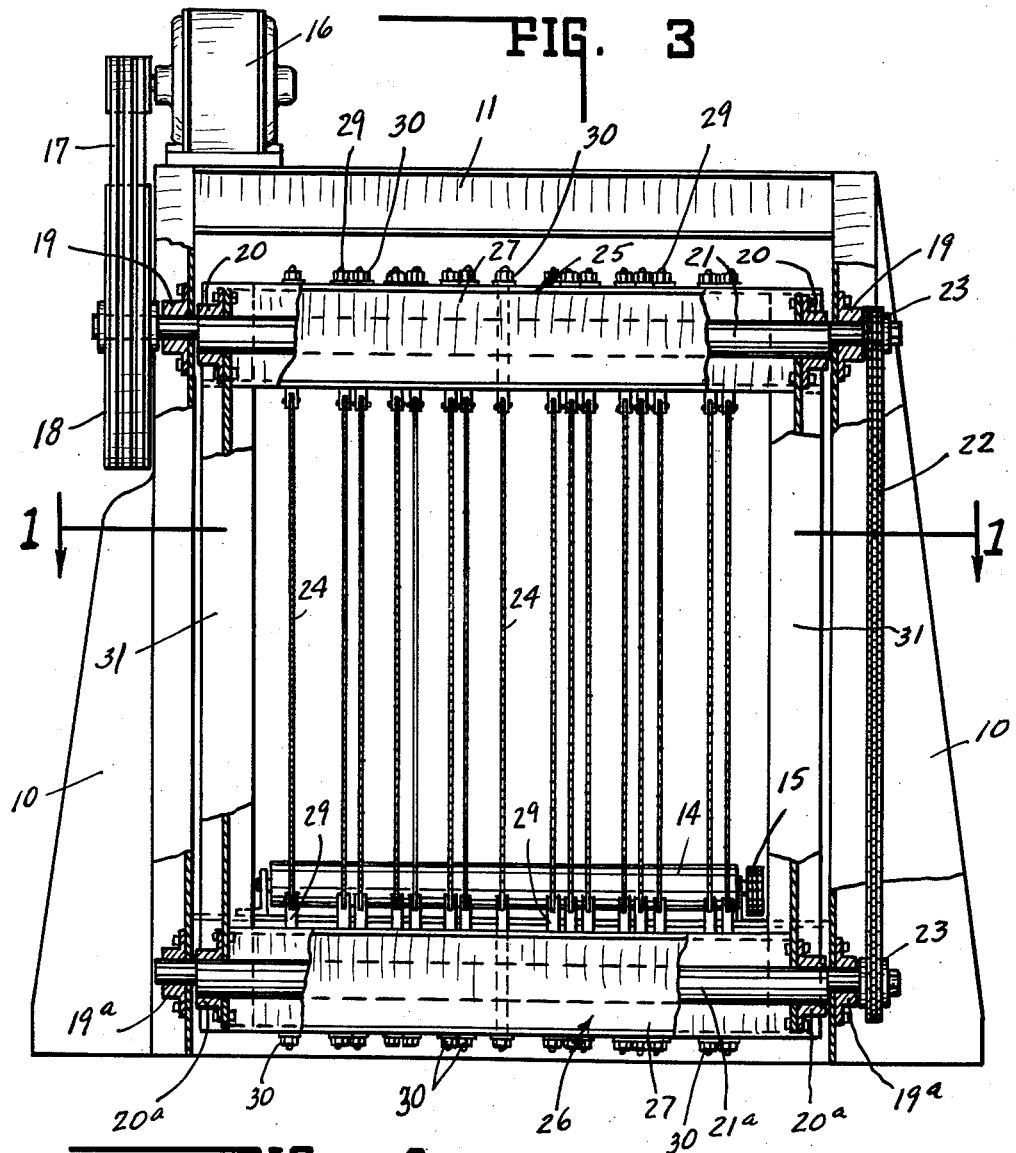
Fig. 3 is an end view thereof with portions shown in section.
Figure 4:
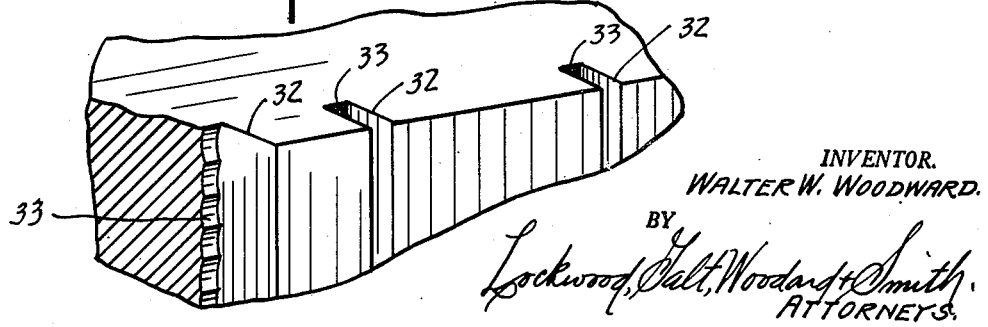
Fig. 4 is a perspective view with parts broken away of a section of the quarried block being cut, illustrating the vertical cut of scalloped configuration.

Mounted upon the upper beam is a motor 16 which through the medium of the V belts 17 drives flywheel or sheave 18. Mounted on one face of each side frame adjacent the tops thereof are the opposed flanged bearings 19 in which are journaled an upper eccentric shaft 21. Similar flanged bearings 19a are mounted on one face of the side frames adjacent the lower ends thereof as shown particularly in Fig. 3. A second eccentric shaft 21a is carried by these last mentioned bearings. The upper shaft is driven by the motor through the medium of the flywheel. On the other hand, the lower shaft is driven by the sprocket chain 22 or other suitable means, the chain being trained around sprocket wheels 23 which are secured to the respective shafts. Thus both shafts simultaneously travel through the same circular path.

Mounting the gang saws or cutting blades 24 are an upper saw frame shown generally at 25 and a lower saw frame shown generally at 26. Both the upper and lower frames are formed by a plurality of channels 27 extending horizontally between the side frames but spaced slightly inwardly therefrom as shown particularly in Fig. 3. The blades 24, the teeth of which have carbide cutting tips 28, are mounted between the upper and lower saw frames and are held therebetween under the proper tension by the bolts 29. It is possible to adjust these bolts to increase or lessen the tension by screwing or unscrewing the nuts 30.

Supporting the respective upper and lower saw frames and more particularly the horizontally extending channels of which they are formed, are the vertically extending I beams 31 to which the channels are suitably connected as by welding or the like.

By reason of the fact that the flanged bearings 20 and 20a are connected to the upper and the lower saw frames respectively, the eccentric motion of the shafts will be imparted to the entire saw frame assembly so that each of the saws will move simultaneously in a circular path with the stone being cut on the downward stroke. The stone will thus be cut vertically from end to end with the inner wall of the grooves or kerfs 32 being characterized by the scalloped formation or configuration 33. It is thus apparent that the cuttings resulting from the action of the saw teeth will naturally fall by gravity to a point below the block thereby effectively eliminating the possibility of a binding action upon the blades because of any residue of cuttings. To facilitate this natural gravity fall-out it is possible to direct water on the saw blades at the top of the stone. Since this flushing or washing-out action is not in and of itself the subject of any claim of patentability it is not illustrated in the drawings. Any suitable system may be employed.

Figure 2:
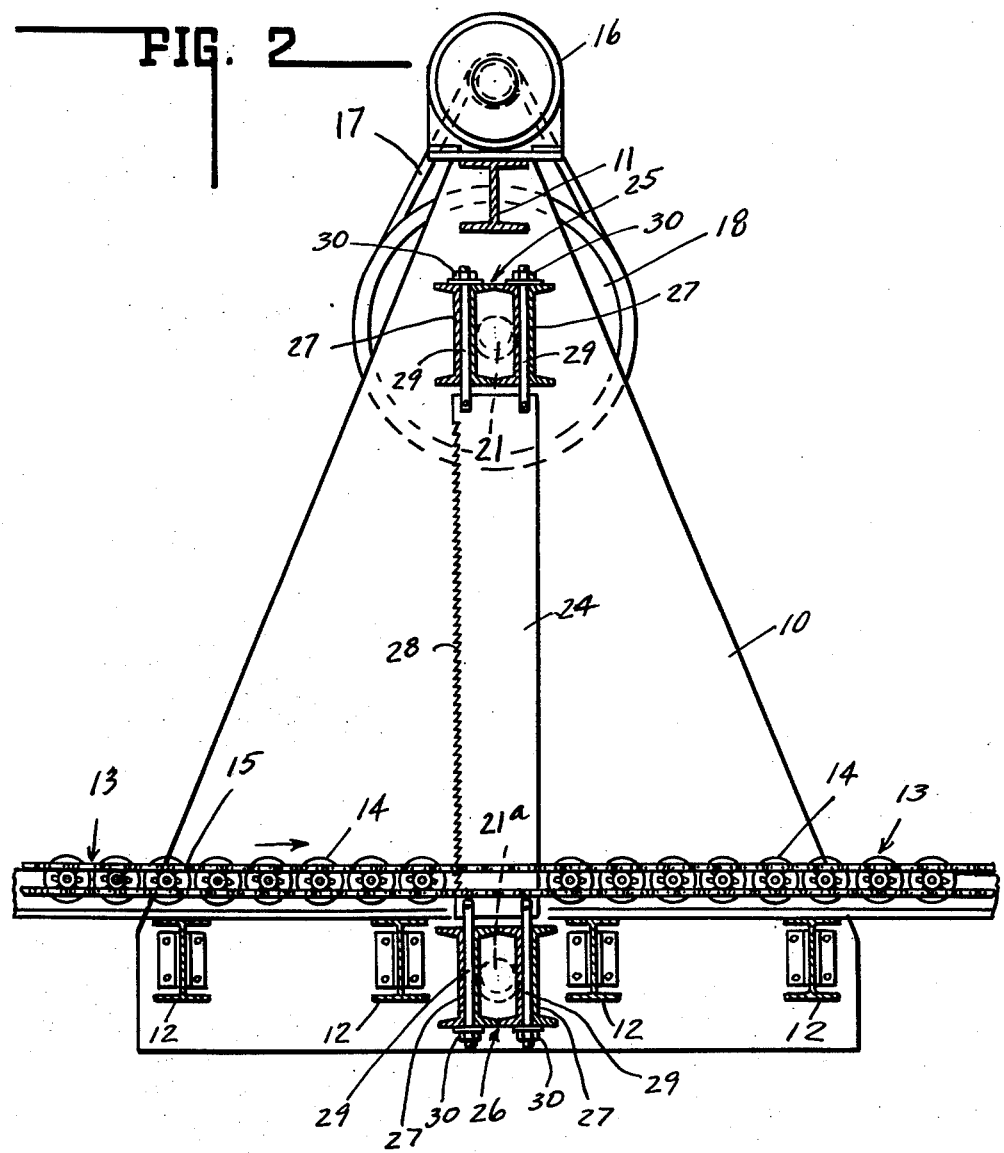
Fig. 2 is a vertical longitudinal section view of the invention.

In operation a block of stone from a quarry will be positioned upon the conveyors whereupon power may be applied to move the stone as shown by the arrow in Fig. 2, towards the vertically disposed cutting blades. The motor which drives the saws through their eccentric path in a vertical plane will have been turned on so that the cutting action will commence on the adjacent end face of the block. As is apparent, a block of limitless length, theoretically, may be fed through the machine with the gang saws cutting vertical grooves or kerfs therein. Since the length of the saws will be greater than the height of the block, the groove or kerf will be cut from top to bottom of the block from one end towards the other. Once the other end of the block is reached the blades will cut through the wall and be free and clear of any kerfs or grooves. Thus, there will be no groove or kerf from which the blades will have to be removed as by the elevating or upward movement characteristic of conventional gang saw machines.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A gang saw construction for cutting stone comprising a pair of parallel side frames, beams connecting said side frames, stone conveying apparatus supported by certain of said beams for feeding blocks of stone between said side frames, an upper and a lower shaft having eccentric portions and journalled in said side frames, power means for driving one of said shafts, means connecting said shafts for synchronizing their motion, and a gang saw frame mounted on the eccentric portions of said shafts and movable therewith, said saw frame mounting a plurality of vertically extending saws having spaced teeth for cutting vertical kerfs in the stone fed into said saws by said conveying apparatus.

2. A gang saw construction for cutting stone comprising a pair of opposed parallel side frames, beams connecting said frames and imparting rigidity thereto, stone conveying apparatus supported by certain of said beams and extending between said frames and therebeyond, an upper and a lower vertically spaced shaft having eccentric portions and journalled in said side frames, power means for driving one of said shafts, means connecting said shafts whereby the other of said shafts is driven simultaneously and in unison with said one shaft, and a gang saw frame interposed between and carried by the eccentric portions of said shafts and movable therewith, said saw frame including a plurality of horizontally spaced vertically extending saws having teeth along one edge thereof for cutting vertical kerfs in the blocks of stone presented to said plurality of saws by said conveying apparatus.

3. A gang saw construction for cutting stone comprising opposed parallel frames, beams connecting the upper and the lower ends respectively of said frames, stone conveying apparatus supported by the beams that connect the lower ends of said frames and extending between said frames and therebeyond, an upper and a lower vertically spaced shaft having eccentric portions extending between said side frames, bearings secured to said side frames within which the outer end portions of said shafts are respectively journaled, power means driving one of said shafts, means connecting said shafts for synchronizing their motion, and a gang saw frame associated with the eccentric portions of said shafts and movable therewith, said saw frame including a plurality of horizontally spaced vertically extending saws having teeth formed along one vertical edge whereby vertical kerfs are cut within a block of stone presented to said saws by said conveying apparatus.

4. A gang saw construction for cutting stone comprising a pair of opposed parallel side frames, beams connecting said side frames, stone conveying apparatus supported by certain of said beams for feeding blocks of stone between said side frames, an upper and a lower shaft journaled in said side frames and having eccentric portions extending between said frames, power means for driving said shafts simultaneously and in unison, and a gang saw frame having top and bottom members to the opposite end portions of which are secured flanged bearings within which the eccentric portions of said shafts are journaled, said saw frame mounting a plurality of vertically extending saws having teeth along one edge thereof for cutting vertical kerfs in the blocks of stone presented to said saws by said conveying apparatus.

5. A gang saw construction for cutting stone comprising a pair of opposed parallel side frames, beams connecting said side frames, stone conveying apparatus supported by certain of said beams for feeding blocks of stone between said side frames, an upper and a lower vertically spaced shaft having eccentric portions extending between said side frames, bearings secured to said side frames within which the outer end portions of said shafts are respectively journaled, power means driving said shafts simultaneously and in unison, and a gang saw frame having top and bottom members provided with bearings within which the eccentric portions of said shafts are respectively journaled said saw frame including a plurality of vertically spaced saws provided with teeth along one edge thereof for cutting vertical kerfs in the blocks of stone presented to said saws by said conveying apparatus.

6. A gang saw construction of the character described in claim 5 wherein adjustable means form the connection between the blade portions of said saws and said upper and lower saw frame member, whereby the tension of said saws may be varied as desired.

7. A gang saw construction of the character described in claim 5 wherein said top and bottom saw frame members comprise horizontally spaced longitudinally extending parallel channels defining openings for reception of the eccentric portion of said shafts.

8. A gang saw construction for cutting stone comprising a pair of opposed parallel side frames of generally triangular configuration, beam struts connecting said side frames adjacent the top and the bottom portions thereof respectively, stone conveying apparatus supported by the struts that connect the lower end portions of said side frames for feeding blocks of stone between said frames, said conveying apparatus including a plurality of interconnected rollers extending between said side frames and therebeyond, an upper and a lower shaft having eccentric portions extending between said side frames, flanged bearings secured to said side frames within which the outer end portions of said shafts are respectively journaled, a motor mounted on one of the upper struts, a flywheel operably associated with said motor and with one outer end portion of one shaft, means connecting the respective shafts whereby the rotation of the shaft connected through said flywheel to said motor is imparted to the other shaft whereby the movements of said shaft are simultaneous and in unison, and a gang saw frame having an upper and a lower horizontally extending member connected adjacent their outer ends by vertically extending elements, said saw frame members being provided adjacent their opposite end portions with flanged bearings within which the eccentric portions of said shafts are journaled, said saw frame including a series of spaced side-by-side vertically extending saws provided with teeth along one edge for cutting vertical kerfs in the blocks of stone presented to said saws by said conveying apparatus.

References Cited in the file of this patent

UNITED STATES PATENTS

| | | |
|---|---|---|
| 3,991 | Pfister | Apr. 10, 1845 |
| 7,441 | Kirk (x series patent) | Feb. 26, 1833 |
| 194,957 | Cotterell | Sept. 11, 1877 |
| 200,593 | Young | Feb. 19, 1878 |
| 578,116 | Peckover | Mar. 2, 1897 |
| 1,097,747 | Bickford | May 26, 1914 |
| 2,712,307 | Stalheim | July 5, 1955 |

FOREIGN PATENTS

| | | |
|---|---|---|
| 54,089 | Switzerland | Dec. 5, 1911 |